United States Patent
Beaven et al.

(10) Patent No.: US 6,604,183 B2
(45) Date of Patent: Aug. 5, 2003

(54) LOG STORAGE MANAGEMENT IN A DATA PROCESSING SYSTEM USING KEY-POINTING

(75) Inventors: John Anthony Beaven, Eastleigh (GB); Martin Mulholland, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 09/892,970

(22) Filed: Jun. 27, 2001

(65) Prior Publication Data

US 2002/0073294 A1 Jun. 13, 2002

(30) Foreign Application Priority Data

Dec. 7, 2000 (GB) ............................................. 0029790

(51) Int. Cl.[7] ............................................. G06F 12/08
(52) U.S. Cl. ..................................... 711/170; 711/165
(58) Field of Search .................................. 711/170, 165

(56) References Cited

U.S. PATENT DOCUMENTS 6,345,280 B1 * 2/2002 Clark et al. .................. 707/200

FOREIGN PATENT DOCUMENTS

GB  2301910 A  12/1996
GB  2344196 A  5/2000

* cited by examiner

*Primary Examiner*—Reginald G. Bragdon
*Assistant Examiner*—Midys Inoa
(74) *Attorney, Agent, or Firm*—David A. Mims, Jr.

(57) ABSTRACT

A data processing apparatus (10, FIG. 1) has a direct access non-volatile storage device (103) on which log records are stored in one or more log files. The processor (101) allocates storage for the log based on possible future requirements. The processor sets the maximum amount of new data that can be written to the log before a key-point operation is performed. When the maximum is reached a key-point is performed. As a result the maximum possible size of the active data written as part of the next key-point can be calculated and storage is allocated accordingly. Should storage become restricted such that the required storage cannot be allocated the data processing apparatus runs in a restricted mode during which the records that are written to the log are concerned with reducing the size of the active data and therefore the next key-point. In transaction processing this is achieved by: not starting new transactions; not allowing transactions to involve new participants; and only allowing transactions to complete.

21 Claims, 8 Drawing Sheets

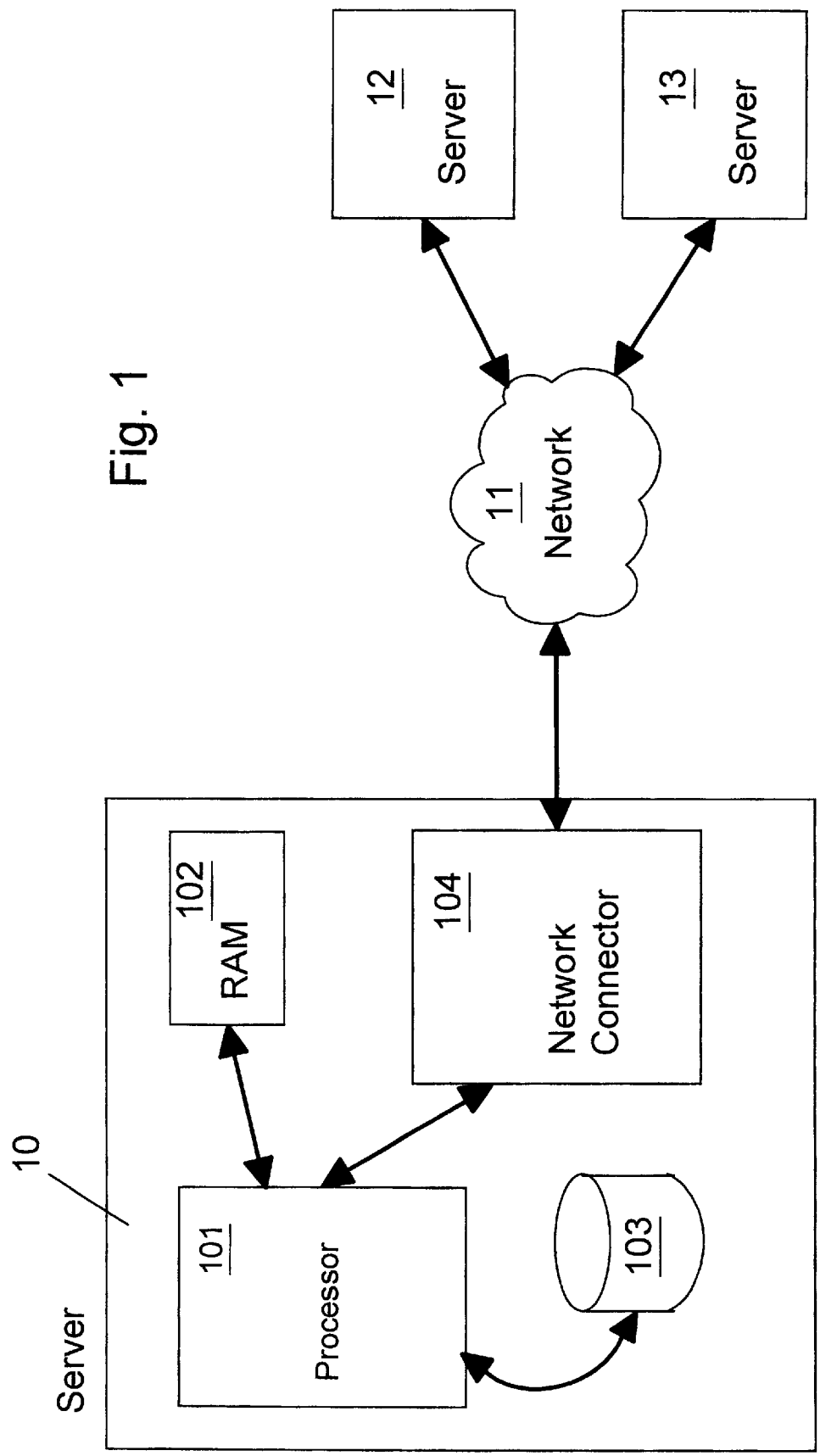

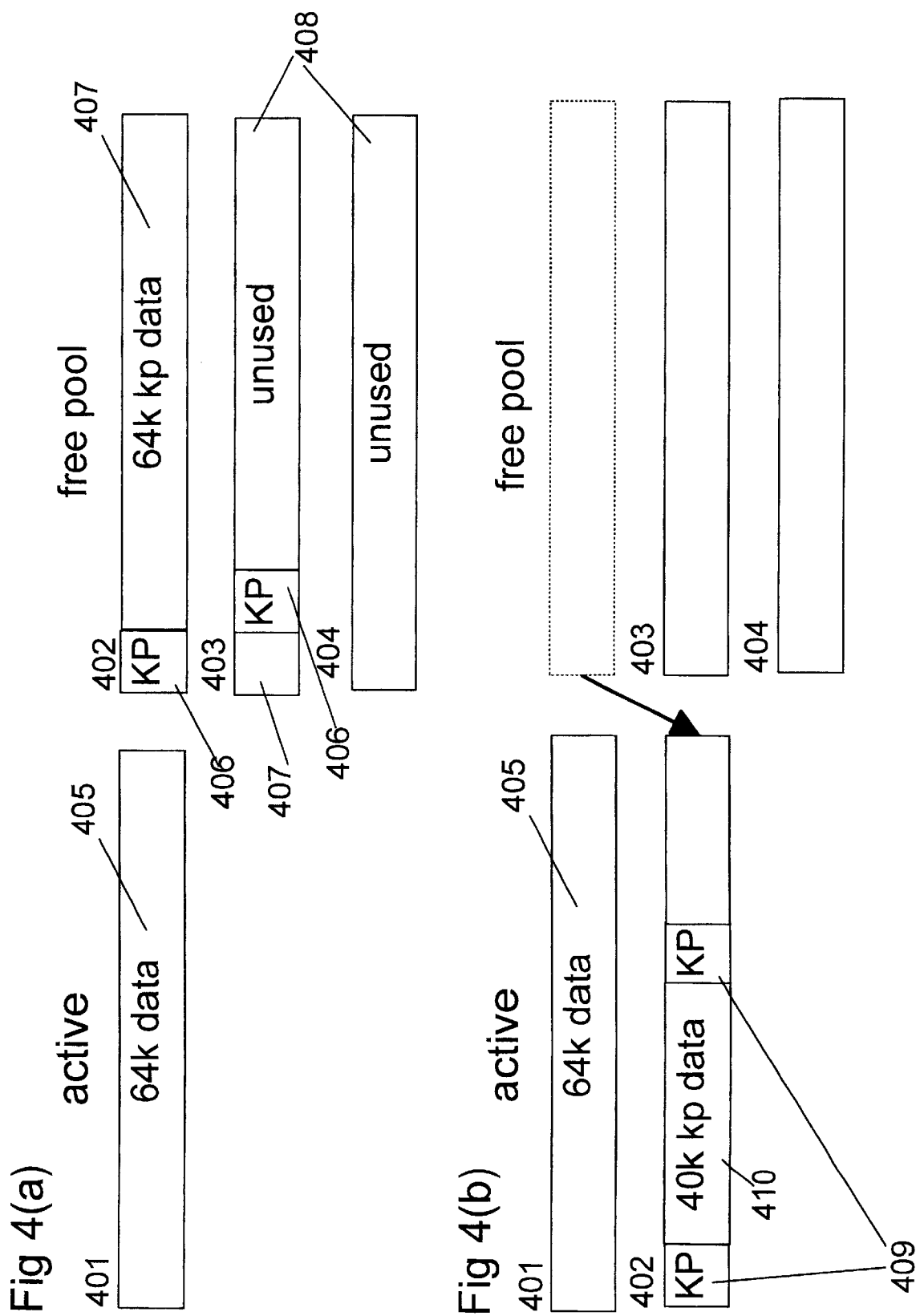

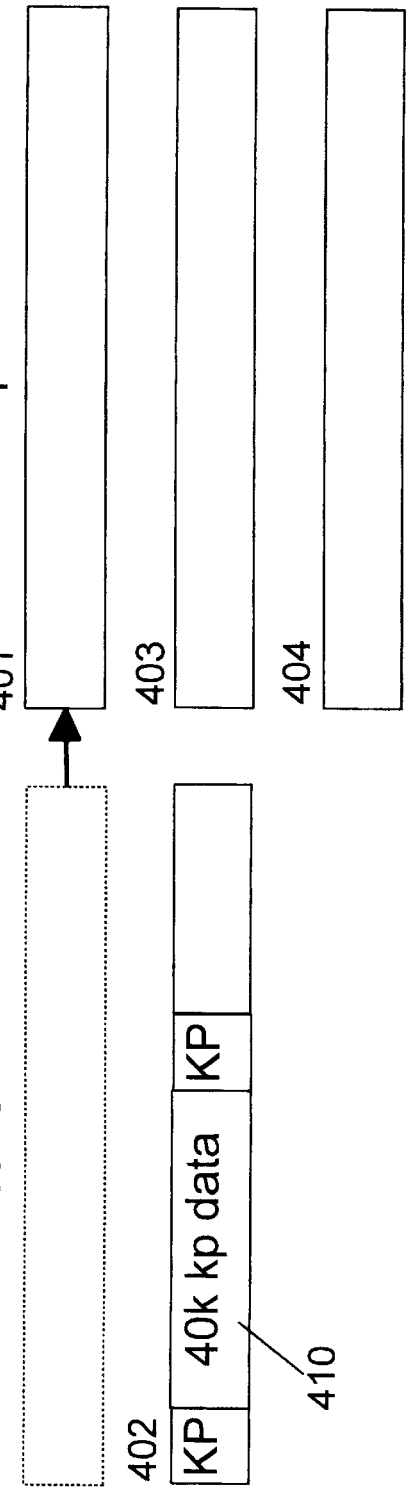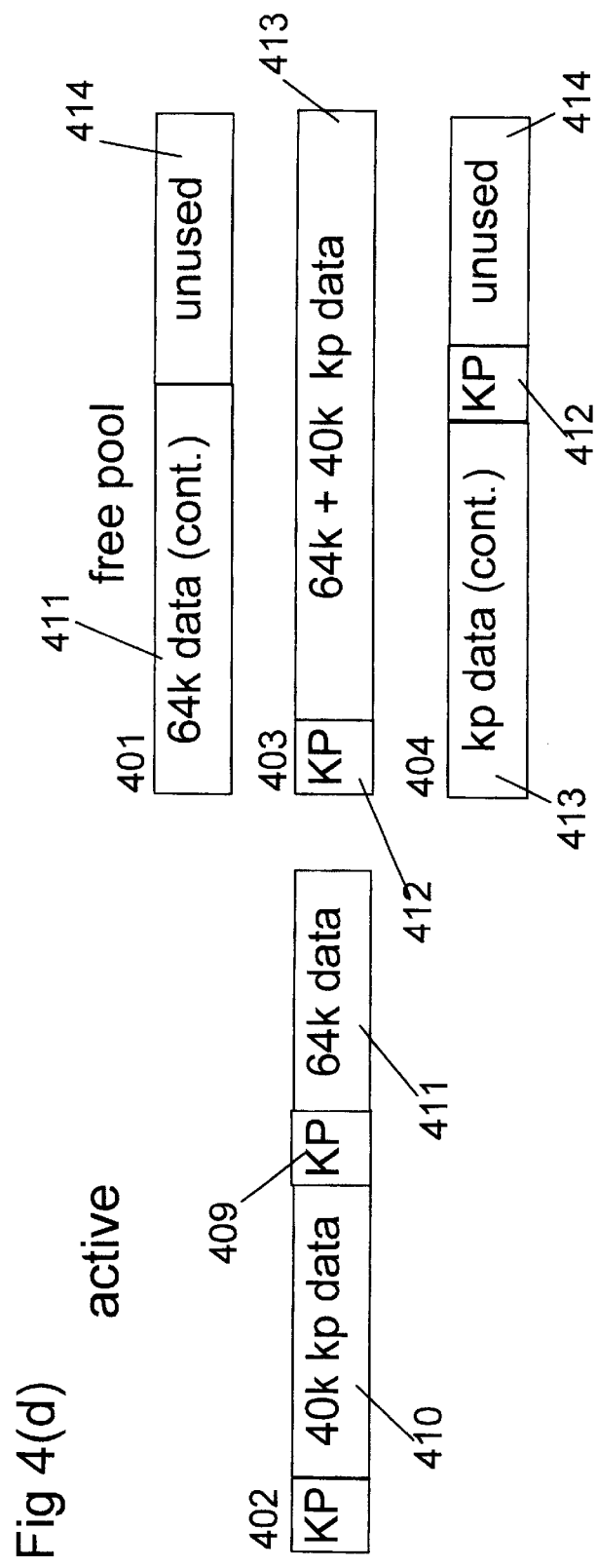

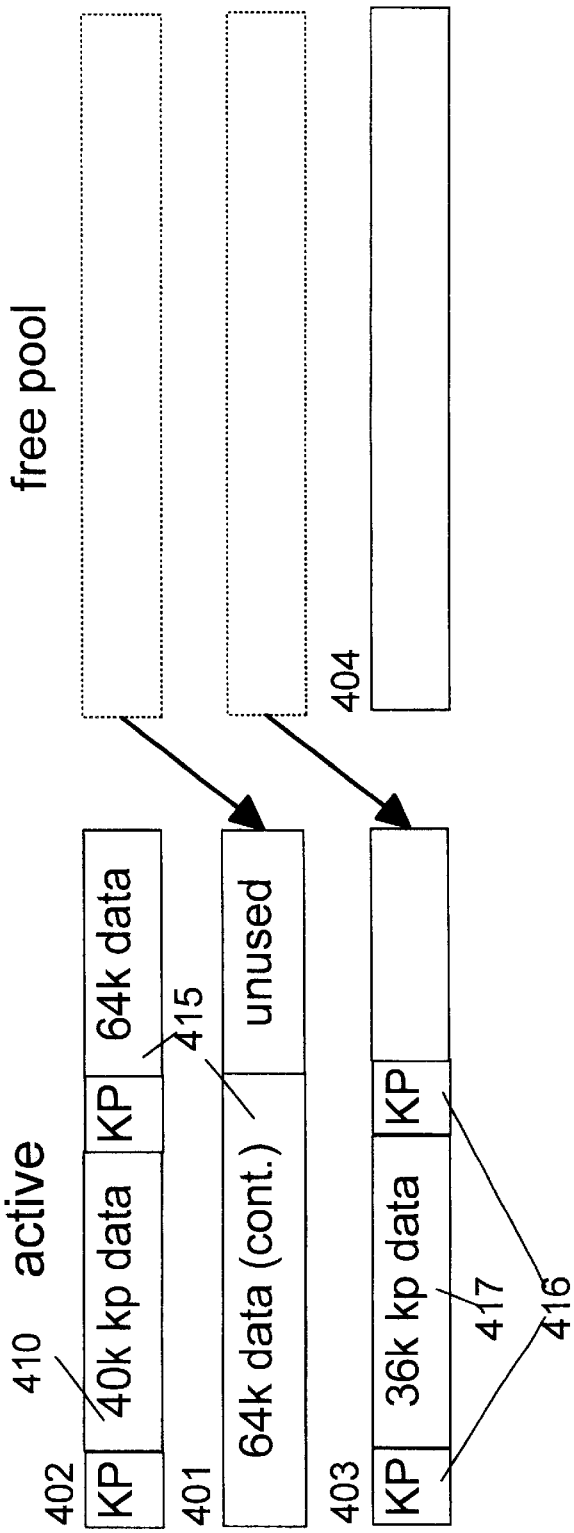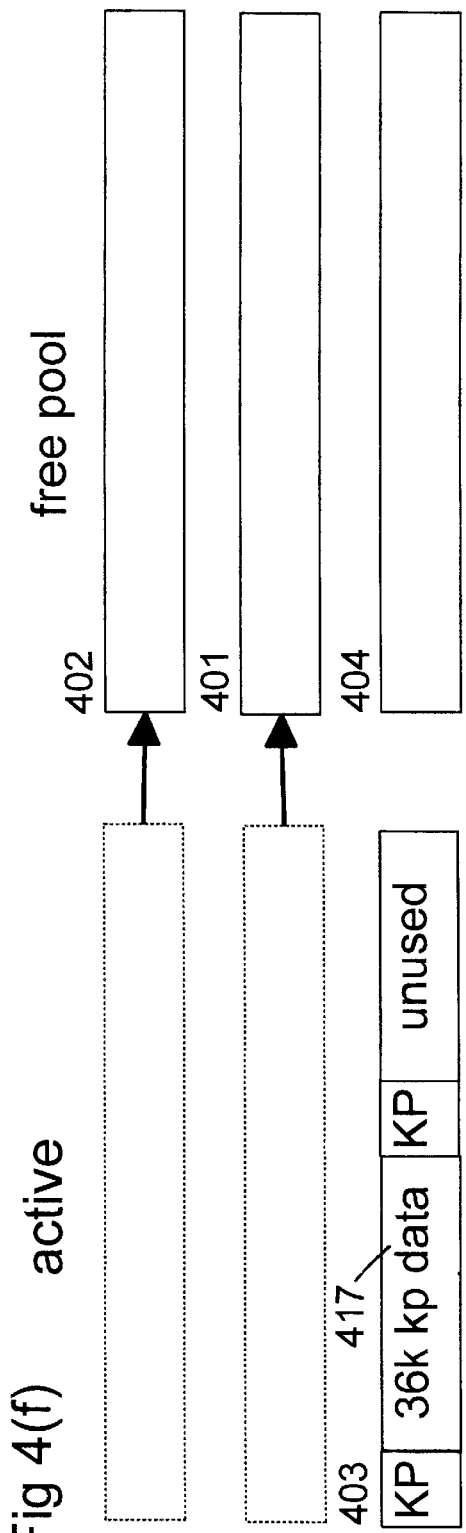

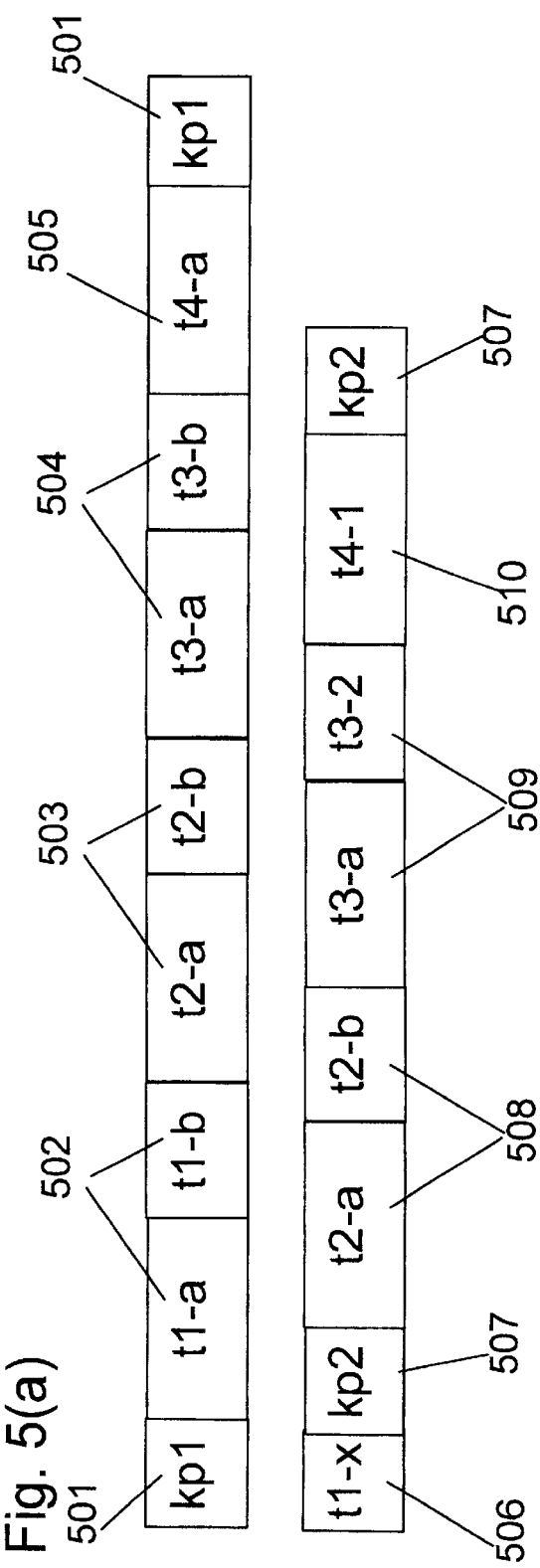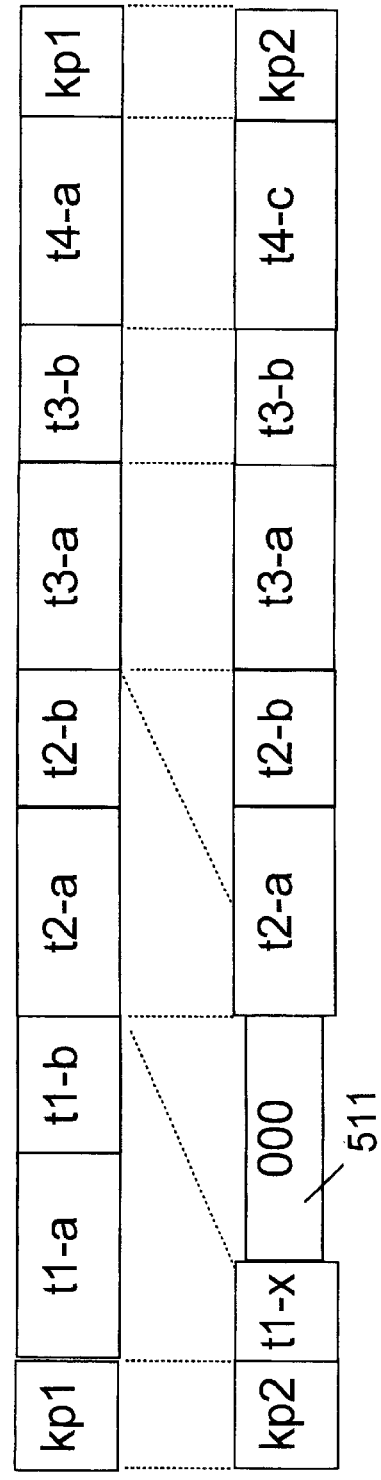
Fig. 5(a)
Fig. 5(b)

LOG STORAGE MANAGEMENT IN A DATA PROCESSING SYSTEM USING KEY-POINTING

CROSS-REFERENCE TO RELATED APPLICATIONS

This application is related to co-pending and commonly assigned patent application, "DATA PROCESSING APPARATUS, METHOD AND COMPUTER PROGRAM WITH OPTIMIZED KEY-POINTING OPERATION FOR LOG RECORD STORAGE", Ser. No. 09/449,401, filed Nov. 26, 1999.

FIELD OF THE INVENTION

The present invention relates to log storage management in a data processing system with a key-pointing operation, and particularly to a mechanism for allocating storage for key-pointing.

BACKGROUND OF THE INVENTION

In certain data processing operations it is useful to maintain a log related to ongoing data processing activity. For example, in the transaction processing field, it is common to maintain a log of ongoing transactions involving a particular data processing apparatus so that if the data processing apparatus should fail for some reason (e.g., power failure) the log can be used to recover the data processing apparatus back to the state it was in, with respect to processing the transactions, before the failure. This is a very important consideration because the business world depends on the processing of transactions to be tolerant of system failures in order to maintain the integrity of mission critical data which is involved in the transactions.

Such logs are typically maintained on a direct access non-volatile storage device (such as a hard disk drive) so that data will not be lost in the case of power failure. As the data processing apparatus processes ongoing transactions, log records containing information pertaining to the ongoing transactions are written sequentially into one or more pre-allocated log files (hereinafter called "extent" files). These log records would thus be retrieved from the extent files to reconstruct the transaction processing environment within the data processing apparatus in the event of a failure to enable a subsequent recovery from such a failure.

The size of an extent file can be configured by the operator and log records are written to an extent file up to the configured size, at which point a new extent file is created in order to store more log records. It is often the case that an extent file is very large as compared to a log record, and thus many log records are stored in a single extent file. Special "link" records are used to link one extent file to the next. A spare extent file known as a "cushion" file is also pre-allocated. This cushion file can be used as an extent file instead of creating a new extent file in the event that the log runs short on disk storage.

To prevent the storage requirements of the extent files continually increasing as more log records are written, an operation known as "key-pointing" is used. This operation takes advantage of the fact that stored log records become redundant. For example, in transaction processing, when a transaction has completed there is no longer a need for the data processing apparatus to store log records for that transaction and there is no longer a need for that transaction to be taken into account in the event of recovering from a failure. As a result, the log records pertaining to that transaction are redundant. If the data contained in a log is DW, it will consist of the data associated with completed transactions (DC) and the data associated with active transactions (DA). It is obvious then that the size of DA will be less than or equal to DW. The key-pointing operation involves rewriting all of the active data (DA) to the log as follows:
1. write a key-point start record to the log.
2. rewrite all the active data (DA) to log.
3. write a key-point end record to the log.
4. release or reassign storage the storage that previously contained DW.

This leaves the log with only the records relating to active transactions.

One example of a key-pointing system is shown in GB 2344196 in which key-points are taken only when an extent becomes full, in order to reduce unnecessary processing. However, in this and other key-point processing systems that handle large numbers of concurrent transactions, it is possible for the size of DA to become very large. As a result it is possible for the storage on which the extent files are maintained to run out such that no new log records can be written. If this happens the processing of a transaction can no longer tolerate a system failure and the transaction process can no longer function. The cushion file provides some measure of protection against this happening, however, the cushion file does not provide full protection as the amount of extra space it provides is arbitrary and it too can be used up.

SUMMARY OF THE INVENTION

The present invention addresses the aforementioned problem of key-pointing, namely of storage becoming exhausted such that new records can no longer be written to the log.

According to a first aspect, the present invention provides a data processing method for use on a data processing system having a direct access non-volatile memory storage device for storing log records thereon in one or more log files, the method comprising the steps of: writing log records to said log files when requested; performing a key-pointing operation on the written log records when a predetermined maximum cumulative size of log records, up to the first key-pointing operation or since the last key-pointing operation, is reached; calculating the amount of storage required to continue writing log records to the completion of a future key-pointing operation; and allocating said required amount of storage.

According to a second aspect, the present invention provides a computer program product for running on a data processing system having a direct access non-volatile memory storage device for storing log records thereon in one or more log files, the program product, in operation, carrying out the steps of: writing log records to said log files when requested; performing a key-pointing operation on the written log records when a predetermined maximum cumulative size of log records, up to the first key-pointing operation or since the last key-pointing operation, is reached; calculating the amount of storage required to continue writing log records to the completion of a future key-pointing operation; and allocating said required amount of storage.

According to a third aspect, the present invention provides a data processing apparatus comprising: a direct access non-volatile memory storage device for storing log records thereon in one or more log files; a writing means for writing log records to said log files; a key-pointing means for performing a key-pointing operation on the written log records when a predetermined maximum cumulative size of log records, up to the first key-pointing operation or since the last key-pointing operation, is reached; calculation means for calculating the required amount of storage to continue writing log records to completion of a future key-point; and allocation means for allocating said required amount of storage.

By providing a data processing system with the capability to predict log storage requirements and because the amount of data written to the log before a key-point is fixed, the maximum size of that key-point can be predicted, and so the storage requirement to completion of that key-point can also be predicted. This can be extrapolated to forecast the maximum log storage requirement to any future key-point operation. As a result storage can be allocated to guarantee log operation to a chosen point in the future.

Preferably the allocating step of the data processing method reuses some or all of the storage that becomes available as a result of a key-pointing operation. This provides an additional advantage because it provides the data processing system with the capability to reuse allocated storage after the data it contains becomes redundant. This can reduce the total log storage requirement and is very useful in a data processing system that has a log storage requirement that does not exceed a particular value. Once the storage has been obtained to meet this requirement it is retained.

In addition, in a system that reuses storage and stores log records in more than one log file it can be an advantage to start a key-point in a new log file. This can be beneficial when the granularity of storage reuse is per file. In this situation a file is made available for reuse a soon as the log records that it contains become redundant, reducing the overall storage requirements of the log.

According to another preferred feature, the system can operate in a reduced mode in response to a predetermined condition, wherein during said reduced mode only log records that will be redundant in the next key-pointing operation are written to the log. This provides a significant advantage to a system as it provides the capability to reduce the size of the active data and therefore reduce log storage requirements, when considered necessary.

The system is further improved if the allocating step is carried out immediately after a key-pointing operation is performed and the predetermined condition for operating in a reduced mode of operation is this allocation failing because of the unavailability of sufficient storage. This ensures that the system starts operating in the reduced mode as soon as a storage restriction is noticed and, if the system also includes the capability to reuse allocated storage after the data it contains becomes redundant, the system is guaranteed to have log space available whilst operating in reduced mode. In addition, if the log records written by the system to reduce the size of the active data are smaller than the log records of the active data, there is guaranteed to be enough space available to reduce the log storage requirements to a level such that the reduced mode can be ended.

Once reduced mode is entered, detecting, as soon as possible, that the storage restriction is no longer present, either because extra storage becomes available or because the log storage requirement has been reduced to a workable level, is an advantage. This can be achieved when the reduced mode of operation is active by performing a key-pointing operation when a record is written to the log that makes some previously active data redundant. If the system also attempts storage allocation after each key-point operation the lifting of the storage restriction will be detected as soon as possible.

If the data processing method is a method of transaction processing whereby the log records represent transactional data that can be used to reconstruct a transactional environment that previously existed, it is preferable that the method further comprises the steps of: rejecting a request to start a new transaction when operating in said reduced mode; and rejecting a request to involve when operating in said reduced mode;

This enables the system with a transaction log to take advantage of the restriction means by only writing records to the log that relate to the completion of transactions when the reduced mode is active.

BRIEF DESCRIPTION OF THE DRAWINGS

A preferred embodiment of the present invention will now be described by making reference to the following drawings:

FIG. 1 is a block diagram of a data processing environment in which the preferred embodiment of the present invention can be advantageously applied;

FIGS. 4(a)–4(f) are schematic representations of the overall changing contents of log files in the method of FIGS. 3(a) and 3(b).

FIGS. 5(a) and 5(b) are schematic representations of the detailed contents of a log file including two key-points and demonstrate how a reduction in log storage requirements is achieved by the present invention.

DETAILED DESCRIPTION OF THE PREFERRED EMBODIMENT

Figure 2A:
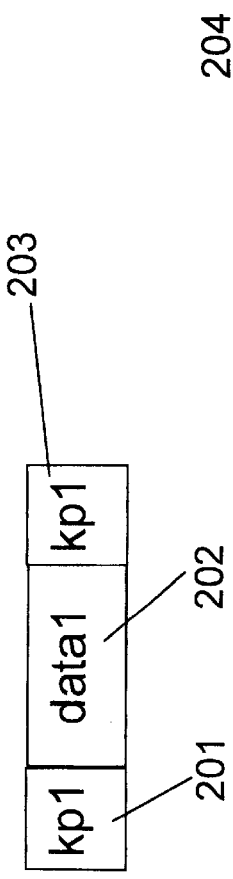
FIGS. 2(a)–2(d) are schematic representations of the overall changing storage requirements of a log file between two key-pointing operations as known from the prior art.

In FIG. 1, a server data processing apparatus 10 is connected to other server data processing apparatuses 12 and 13 via a network 11, which could be, for example, the Internet. The servers 10, 12 and 13 interact with each other, in the preferred embodiment, to carry out the processing of transactions (e.g, updates to bank accounts). Server 10 has a processor 101 for controlling the operation of the server 10, a RAM volatile memory element 102 for temporarily storing data concerning the transactions that are being carried out, a non-volatile memory 103 for also storing such data so that the transactions can be recovered in case of a server failure, and a network connector 104 for use in interfacing the server 10 with the network 11 so that the server 10 can communicate with the other servers 12 and 13 in the processing of transactions. It should be noted that a network of servers is shown in the preferred embodiment but in other embodiments the server 10 could be operating alone in processing transactions without interacting with other servers.

The data stored on non-volatile memory 103, to enable transactions to be recovered in the case of failure, is stored in a log as log records where the log is made up of one or more extent files. Should the server 10 experience a failure (e.g., a power loss), upon recovering, the server 10 uses the log to recreate the transaction processing environment that existed prior to the failure, as was discussed above.

Figure 2B:
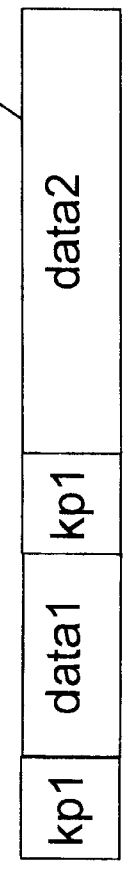
Figure 2C:
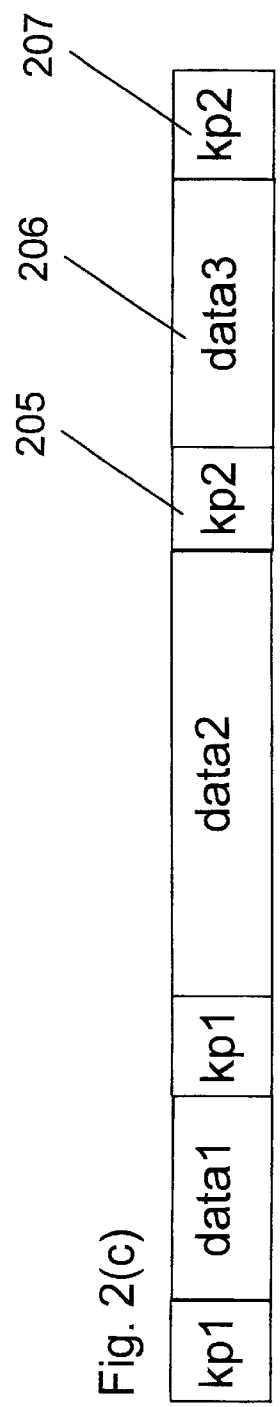
Figure 2D:
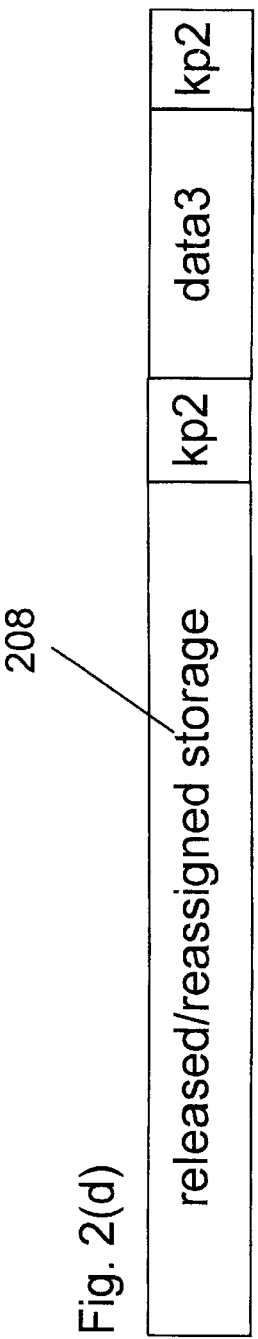

The changing contents of the log over time is shown schematically in FIGS. 2(a)–2(d). FIG. 2(a) shows the log contents immediately after a completed key-pointing operation. It contains a key-point that consists of: a key-point start record (kp1) (201); the key-point data (data1) (202) that contains only active data; and the key-point end record (kp1) (203). FIG. 2(b) shows the log contents some time later, immediately before the next key-pointing operation is performed. This now further includes the data (data2) (204) that has been written to the log following the previous key-pointing operation. It is clear that although data1 contained only active records when it was written, this is not necessarily still the case. FIG. 2(c) shows the log contents after the next key-pointing operation is completed. It now also contains a second key-point that consists of: a key-point start record (kp2) (205); the key-point data (data3) (206) that contains the new active data; and the key-point end record (kp2) (207). Here data3 will be equal to, or a subset of, the key-point data (data1) from the previous key-point and the data (data2) written between the two key-pointing operations. It will be equal if no transactions were completed between the two key-pointing operations. FIG. 2d shows the contents of the log on completion of the second key-pointing operation and after the storage (208), previously used to store data1, data2 and the key-point delimiters kp1, has been released or reassigned.

Figure 3A:
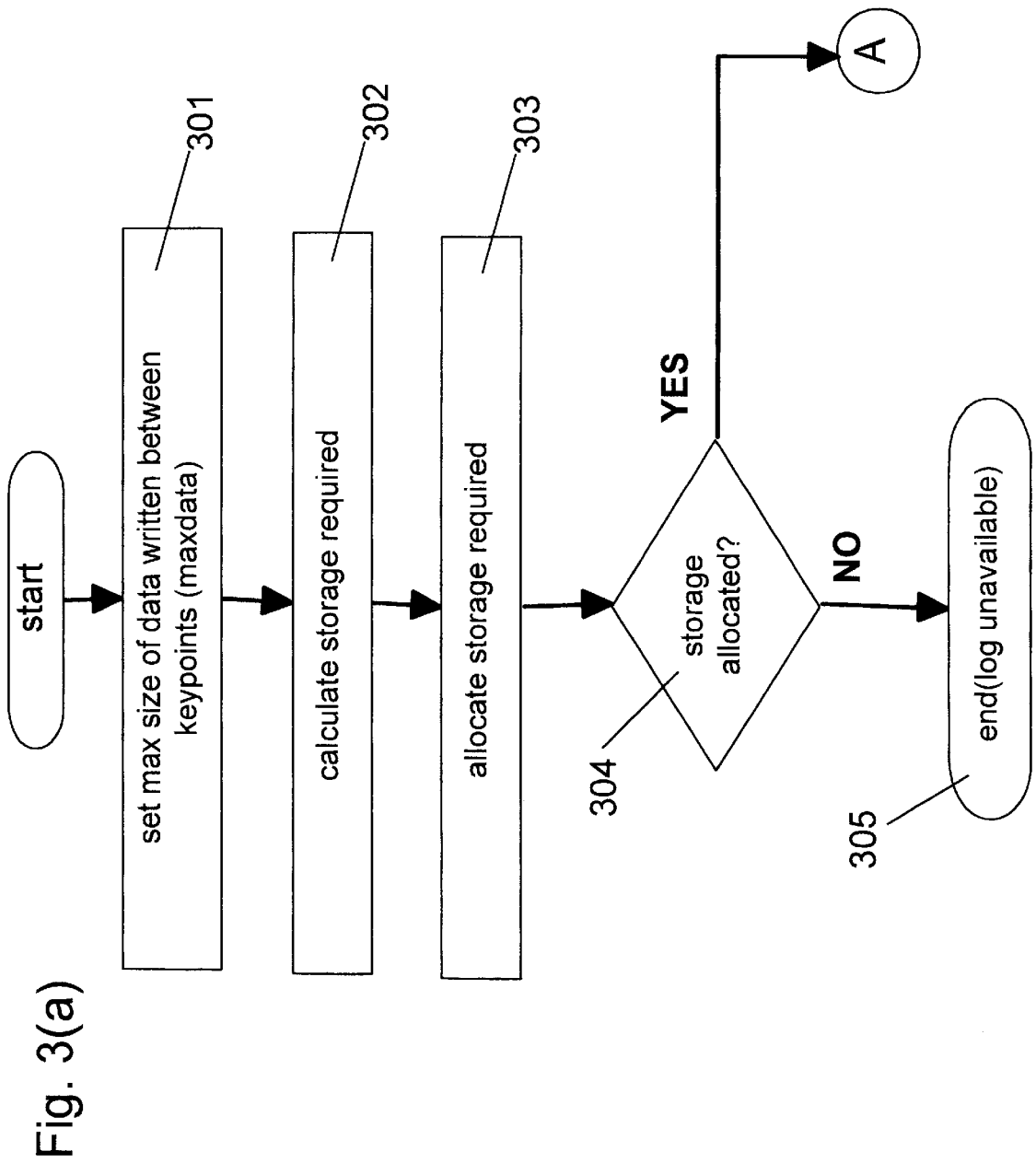
FIGS. 3(a) and 3(b) constitute a flow chart showing the processing steps of a method of managing key-pointing in a data processing apparatus, according to the present invention.
Figure 3B:
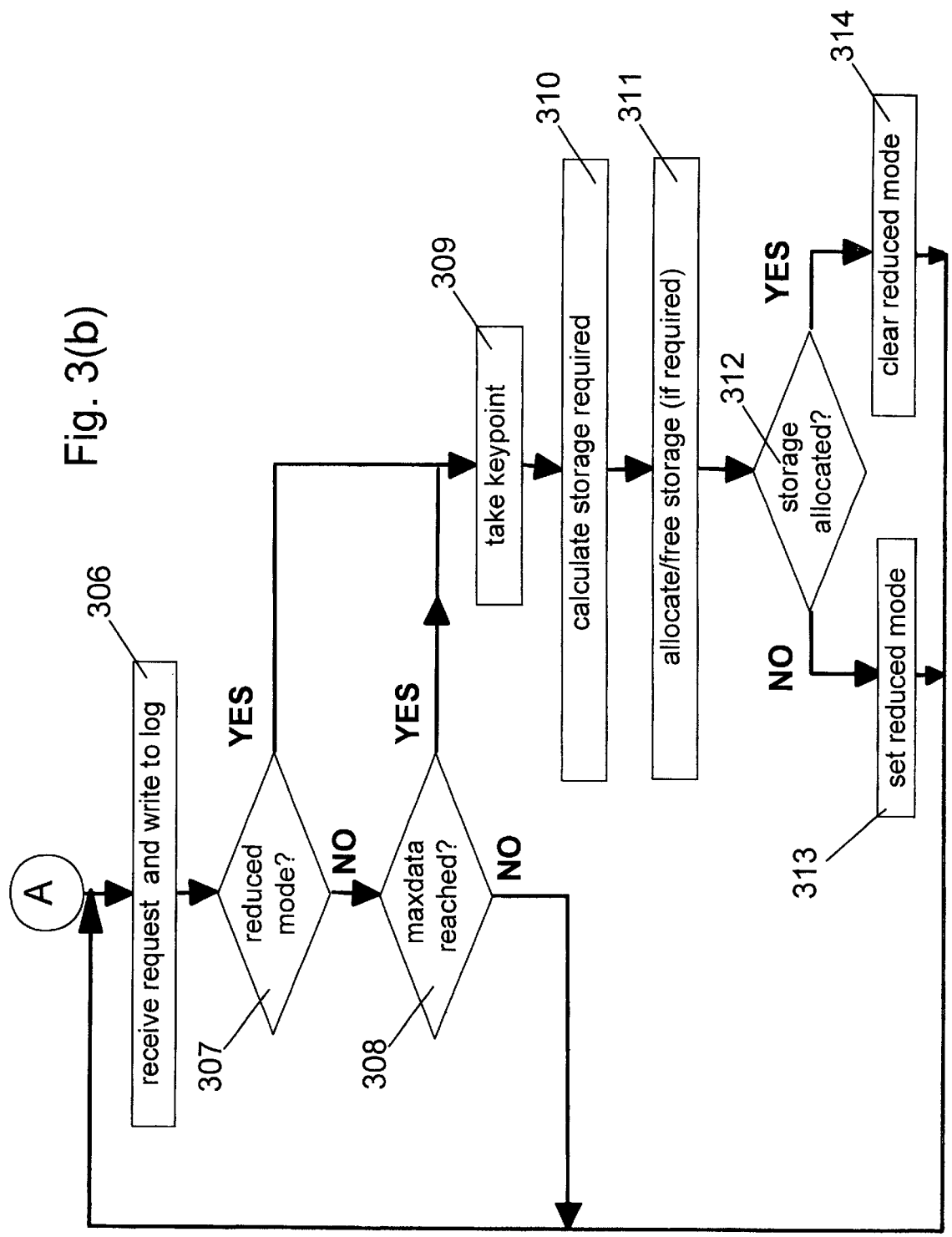

How the processor 101, in the preferred embodiment, manages the log according to the method of the invention is shown in FIGS. 3(a) and 3(b). Referring to FIG. 3(a), at step 301 the maximum size of the data (maxdata) permitted to be written between key-pointing operations is set. In the preferred embodiment the extent file size is configurable by the user and has a default value of 64 kB. For the remainder of this description both maxdata and the extent file size will be set to 64 kB. Also, although not required by the present invention, maxdata will remain constant. At 302 the initial storage requirement is calculated to enable running to the completion of the next key-pointing operation. This must be enough to write 64 kB (maxdata) of log records followed by a key-point. If no transactions were completed in this time, the key-point would also contain 64 kB of key-point data. As a result the initial log storage requirement is: 64 kB (to write the initial data)+64 kB (to write key-point data that includes all of the initial data)+ the size of the key-point start and end records. However, because it is anticipated that, once the first key-pointing operation is completed, this storage requirement will increase, 256 kB is allocated at this time to allow for future growth. The initial possible contents of the extent files calculated are shown in FIG. 4(a). This shows an active extent file (401), into which the first 64 kB of data (405) may be written, and three 64 kB extent files (402, 403, 404) in the free pool. In the first two files in the free pool, space is allocated for the first key-pointing operation. This includes: key-point start and end records (406); and a maximum 64 kB of key-point (active) data (407). The remaining space (408) has no planned immediate use. Note that key-point start and end records are each approximately 24 bytes of data in the preferred embodiment.

Processing then continues at step 303 where space requirement as calculated at step 302 is allocated in the form of four 64 kB extent files. At step 304, the processor checks the result of the storage allocation: if the required extent files have been allocated, one extent file becomes active and three extent files are placed in a free pool of extent files, and processing continues in FIG. 3(b); if the required extent files could not be allocated the log is made unavailable to the transaction service. Note that a cushion file is not required. Note also that although in the preferred embodiment the extent file size matches the size specified by maxdata this does not need to be the case.

The processor continues with step 306 in FIG. 3(b). At this step new data is written sequentially to the next available active extent file when requested by the transaction service. Having written to the extent file, at step 307, the processor checks to see if the reduced mode, as will be explained further below, is active. If reduced mode is not active (the initial state) processing proceeds to step 308 where a check is made to see if the amount of data written since the previous key-pointing operation, or since logging started if there has not been a previous key-point operation, has reached maxdata. As maxdata must not be exceeded, it is considered to have been reached if the next write is likely to exceed it. In the preferred embodiment the maximum record size is 2 kB and so maxdata is reached once 62 kB of data has been written to the log. If maxdata has not been reached, processing continues normally at step 306. However, if maxdata has been reached processing continues to step 309 where a key-pointing operation is performed. Irrespective of how much space in the current extent file has been used, the key-pointing operation is started in a new extent file taken from the free pool. When the key-pointing operation has completed, any previously written active extent files become free and are moved into the free pool. The extent file contents during this step are illustrated in FIGS. 4(b) and 4(c). FIG. 4(b) shows log extent file (402) is moved from the free pool and made active. Into it is written: the key-point start and end records (409); and 40 kB of key-point (active) data (410). Note that this key-point is less than the 64 KB allowed for at step 302 and this based on the assumption that some transactions have completed. On completion of this key-point FIG. 4(c) shows the extent file (401) that contained the original data is moved to the free pool.

Processing then continues to step 310, where a new storage requirement is calculated as 64 kB (for new data)+64 kB (for all of the new data to be written by the next key-pointing operation)+the size of the key-point written by the key-point operation performed at 309 (for all of the key-point data to be rewritten by the next key-pointing operation). Note that the size of the key-point includes the key-point start and end records and so there is no requirement to allow for key-point start and end records in this calculation. FIG. 4(d) shows this requirement as planned possible contents of the extent files. The 64 kB (maxdata) of new data (411) will start in the active file (402) that contains the key-point end record (409), and finish in an extent file (401) taken from the free pool. The next key-pointing operation will write a key-point in the next extent files (403, 404) taken from the free pool. It will contain key-point start and end records (412) and could contain a maximum of 40 kB+64 kB of key-point data (413), the maximum key-point data being made up of all of the 40 k of key-point data (410) from the key-point just written and all of the 64 kB of new data (411). This would happen if no transactions were completed between the key-pointing operations. The storage that has no planned use (414) is also shown. As can be seen, the free pool storage requirement equates to 3 extent files.

Having calculated the storage required at step 310, the processor continues a step 311 in FIG. 3(b) where storage is allocated according to the calculated requirement. If the free pool provides sufficient space, processing continues although, if there are more extent files in the pool than are required, the extra extents are freed. If there is insufficient space, new extent files of 64 kB are allocated as required and added to the free pool. At step 312 the result of the storage allocation is checked: if there is sufficient storage available in the free pool the reduced mode is cleared if necessary at step 314; if there is insufficient storage available in the free pool the reduced mode function is set at step 313.

Processing then returns to step 306 and continues around a loop, processing in the manner described above, until the processor is stopped. However, the extent file contents following the key-pointing operation performed at step 309 will be different for subsequent key-pointing operations to those described above. This is because the log will also contain a previous key-point. By way of example the second key-point written to the log is illustrated in FIGS. 4(*e*) and 4(*f*). FIG. 4(*e*) shows the log contents when the second key-point was written to the log at step 309 in FIG. 3(*b*). Active extent (402) includes the previous key-point with 40 kB of key-point data (410) and some of the 64 kB of new data (415) that was also partly written to an extent file (401) taken from the free pool. An extent file (403) is made active from the free pool and into it is written: the key-point start and end records (416); and 36 kB of key-point data (417). Note that this key-point is less than 104 KB, as allowed for at the previous processing of step 310 and this is based on the assumption that some transactions have completed in the meantime. On completion of this key-point FIG. 4(*f*) shows the extent files (402, 401) that contained the original key-point and data are moved to the free pool. The extent file contents will be similar for all subsequent key-pointing operations.

Looking back to step 307 which is processed immediately after data has been written to an active extent file. This step checks to see if the reduced function mode is active. If it is active, processing immediately proceeds to step 309, where a key-pointing operation is performed as described above. In the preferred embodiment each record written in reduced mode reduces the size of the active data and so the problem of insufficient storage could be alleviated by any write. For this reason a key-pointing operation can be performed after every write although an implementation could choose to do this less often.

In the preferred embodiment, reduced mode requires the cooperation of the transaction service. In this mode the transaction service must only write records to the log that will be redundant in the next key-pointing operation. As a result, in reduced mode the transaction service must:
prevent any new transactions from starting.
prevent existing transactions from involving more participants that require new information to be written to the log.
only accept requests to complete transactions.

This ensures that the only records written to the log will be those that relate to the completion of transactions, thus satisfying the requirements of reduced mode.

In the preferred embodiment the transaction service therefore includes the capability to disable the methods for starting a new transaction and involving a new participant in a transaction. When the reduced mode becomes active these methods are disabled and when reduced mode becomes inactive these methods are re-enabled.

Note also that, in the preferred embodiment, in the reduced mode of operation there will always be sufficient storage available in the free pool. Because a key-pointing operation is always started in a new extent, when it completes, the files that become redundant and are added to the free pool must contain at least as much space as that used by the key-pointing operation. In addition, although the size of the data required to complete a transaction is implementation specific it is a reasonable assumption that it will be less than the size of data required for an active transaction. On this basis, immediately the reduced mode is entered it can be assumed that the amount of storage required to write completion records and take another key-point will be less than the size of the previous key-point and thus less that the storage available in the free pool.

FIGS. 5(*a*) and 5(*b*) illustrate this point. FIG. 5(*a*) shows two key-points and individual data records. The data records are labeled t<n>-<y>where:<n>is a number that is used to distinguish transactions and; <y>is a letter that is used to distinguish records for a transaction and the letter "x" is used to distinguish a transaction completion record. The first key-point is delimited by start and end records (501) and contains the records for 4 active transactions t1(502), t2(503), t3(504) and t4(505). On completing the key-pointing operation the transaction service enters reduced function mode, t1 is completed and it's completion record (506) is written to the log. The next key-point is then taken and is delimited by start and end records (507). It contains the records for the 3 remaining active transactions t2(508), t3(509) and t4(510). FIG. 5(*b*) compares the data written by the first key-pointing operation with the data written afterwards, up to and including completion of the second key-pointing operation. The record marked "000" (511) represent the reduced storage requirement.

What is claimed is:

1. A data processing method for use on a data processing system, the data processing system having a direct access non-volatile memory storage device for storing log records thereon in one or more log files, the method comprising the steps of:

writing log records to said log files when requested;

performing a key-pointing operation on the written log records when a predetermined maximum cumulative size of log records, up to the first key-pointing operation or since the last key-pointing operation, is reached;

calculating the amount of storage required to continue writing log records to the completion of a future key-pointing operation; and allocating said required amount of storage.

2. A method as claimed in claim 1 wherein said allocating step reuses some or all of the storage that becomes available as a result of a key-pointing operation.

3. A method as claimed in claim 2 wherein said key-pointing operation starts writing records to the log in a new log file.

4. A method as claimed in claim 1, further comprising the step of:

operating in a reduced mode, in response to a predetermined condition, wherein during said reduced mode only log records that will be redundant in the next key-pointing operation are written to the log.

5. A method as claimed in claim 4 wherein the step of allocating said required amount of storage is carried out immediately after a key-pointing operation is performed and wherein said predetermined condition for operating in a reduced mode of operation is the unavailability of said requested amount of storage for said allocation step.

6. A method as claimed in claim 5 wherein, when operating in a reduced mode, said performing step performs an additional key-pointing operation after a record is written to the log that makes some previously active data redundant.

7. A method as claimed in claim 4, which is a method of transaction processing whereby the log records represent transactional data that can be used to reconstruct a transactional environment that previously existed, said method further comprises the steps of:

rejecting a request to start a new transaction when operating in said reduced mode; and rejecting a request to involve a new participant in a transaction when operating in said reduced mode.

8. A computer program product for running on a data processing system having a direct access non-volatile memory storage device for storing log records thereon in one or more log files, the program product, in operation, carrying out the steps of:

writing log records to said log files when requested;

performing a key-pointing operation on the written log records when a predetermined maximum cumulative size of log records, up to the first key-pointing operation or since the last key-pointing operation, is reached;

calculating the amount of storage required to continue writing log records to the completion of a future key-pointing operation; and allocating said required amount of storage.

9. A computer program as claimed in claim 8 wherein the said allocating step reuses some or all of the storage that becomes available as a result of a key-pointing operation.

10. A computer program as claimed in claim 9 wherein the said key-pointing operation starts writing records to the log in a new log file.

11. A computer program as claimed in claim 8 which in operation carries out the further step of:

operating in a reduced mode in response to a predetermined condition, wherein during said reduced mode only log records that will be redundant in the next key-pointing operation are written to the log.

12. A computer program as claimed in claim 11 wherein the said step of allocating said required amount of storage is carried out immediately after a key-pointing operation is performed and wherein said predetermined condition for operating in a reduced mode of operation is the unavailability of said required amount of storage for said allocation step.

13. A computer program as claimed in claim 12 wherein, when operating in a reduced mode, said performing step performs an additional key-pointing operation after a record that makes some previously active data redundant is written to the log.

14. A computer program as claimed in claim 11 which is a transaction processing program whereby the log records represent transactional data that can be used to reconstruct a transactional environment that previously existed, said program, in operation carrying out the further steps of:

rejecting a request to start a new transaction when operating in said reduced mode; and rejecting a request to involve a participant in a transaction when operating in said reduced mode.

15. A data processing apparatus comprising:

a direct access non-volatile memory storage device for storing log records thereon in one or more log files;

a writing means for writing log records to said log files;

a key-pointing means for performing a key-pointing operation on the written log records when a predetermined maximum cumulative size of log records, up to the first key-pointing operation or since the last key-pointing operation, is reached;

calculation means for calculating the required amount of storage to continue writing log records to completion of a future key-point; and allocation means for allocating said required amount of storage.

16. Apparatus as claimed in claim 15 further comprising a means to reuse some or all of the storage that becomes available as a result of a key-pointing operation.

17. Apparatus as claimed in claim 16 wherein said key-pointing means starts said key-pointing operation in a new log file.

18. Apparatus as claimed in claim 15 further comprising:

a restriction means responsive to a predetermined condition to enable a reduced mode of operation during which only log records that will be redundant in the next key-pointing operation may be written.

19. Apparatus as claimed in claim 18 wherein said predetermined condition is the unavailability of said required amount of storage to said allocation means.

20. Apparatus as claimed in claim 19 wherein, when said reduced mode of operation is active, said key-pointing means performs an additional key-pointing operation after a record that makes some previously active data redundant is written to the log, said allocation means allocating storage in response to each key-pointing operation.

21. Apparatus as claimed in claim 18 which is capable of transaction processing wherein the log records represent transactional data that can be used to reconstruct the transactional environment that previously existed in the apparatus, the apparatus further comprising:

start means to start a new transaction;

involvement means to involve a participant in a transaction; and finish means to complete a transaction;

wherein said restriction means disables said start means and said involvement means when said reduced mode is active.

* * * * *